(12) United States Patent
Jung et al.

(10) Patent No.: US 9,476,448 B2
(45) Date of Patent: Oct. 25, 2016

(54) JOINT DEVICE FOR A MOTOR VEHICLE

(71) Applicant: ZF Friedrichshafen AG, Friedrichshafen (DE)

(72) Inventors: Frank Jung, Sulingen (DE); Holger Hardt, Geeste (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/652,829

(22) PCT Filed: Nov. 18, 2013

(86) PCT No.: PCT/EP2013/074006
§ 371 (c)(1),
(2) Date: Jun. 17, 2015

(87) PCT Pub. No.: WO2014/095190
PCT Pub. Date: Jun. 26, 2014

(65) Prior Publication Data
US 2015/0362008 A1  Dec. 17, 2015

(30) Foreign Application Priority Data
Dec. 19, 2012 (DE) ........................ 10 2012 223 829

(51) Int. Cl.
*F16C 11/10* (2006.01)
*F16F 1/38* (2006.01)
(Continued)

(52) U.S. Cl.
CPC .............. *F16C 11/10* (2013.01); *B60G 7/001* (2013.01); *B60G 7/04* (2013.01); *F16F 1/3863* (2013.01); *F16C 11/0614* (2013.01); *F16C 11/083* (2013.01); *Y10T 403/32426* (2015.01)

(58) Field of Classification Search
None
See application file for complete search history.

(56) References Cited

U.S. PATENT DOCUMENTS 3,482,465 A  12/1969 Lusted
3,781,073 A  12/1973 Jorn et al.
(Continued)

FOREIGN PATENT DOCUMENTS

DE  20 2004 019 733 U1  4/2005
DE  10 2006 013 048 A1  10/2007
(Continued)

OTHER PUBLICATIONS

German Office Action Corresponding to 10 2012 223 829.8 mailed Oct. 22, 2014.
(Continued)

*Primary Examiner* — Victor Macarthur
(74) *Attorney, Agent, or Firm* — Davis & Bujold PLLC; Michael J. Bujold

(57) ABSTRACT

A joint device (1) having an axially extending pivot pin (3), in particular a so-termed claw, and an elastically deformable layer (5) that wholly or partially surrounds the pivot pin radially. The deformable layer is at least partially in contact on its radially outer side (6) with a housing (2) and is connected, such as by vulcanization at least at one axial end, with an annular body (7). The pivot pin (3) with the elastically deformable layer (5) and the at least one annular body (7) form a joint body (8) which can move relative to the housing (2) and is designed, in such a manner, that the ability of the joint body (8) to rotate about its longitudinal axis (9) is inhibited by a rotation-impeding device (10) and by the contact of the outside (6) of the elastically deformable layer (5) against the housing.

12 Claims, 3 Drawing Sheets

(51) Int. Cl.
*B60G 7/00* (2006.01)
*B60G 7/04* (2006.01)
*F16C 11/08* (2006.01)
*F16C 11/06* (2006.01)

(56) References Cited

U.S. PATENT DOCUMENTS

| | | | | |
|---|---|---|---|---|
| 4,144,724 A | * | 3/1979 | Armasow | F16C 19/381 |
| | | | | 464/128 |
| 4,458,956 A | * | 7/1984 | Rendell | F16C 11/0614 |
| | | | | 384/26 |
| 7,237,761 B2 | * | 7/2007 | Kohlen | F02D 9/08 |
| | | | | 251/306 |
| 2010/0054851 A1 | | 3/2010 | Bohne et al. | |
| 2014/0314361 A1 | * | 10/2014 | Moratz | F16C 25/083 |
| | | | | 384/489 |

FOREIGN PATENT DOCUMENTS

| | | |
|---|---|---|
| DE | 10 2006 061 974 A1 | 7/2008 |
| DE | WO 2010085932 A1 * 8/2010 .......... F16C 11/0614 |
| EP | 0 007 430 A1 | 2/1980 |
| FR | 2 126 016 | 9/1972 |
| FR | 2 159 152 | 6/1973 |
| GB | 1 423 032 | 1/1976 |

OTHER PUBLICATIONS

International Search Report Corresponding to PCT/EP2013/074006 mailed Feb. 28, 2014.
Written Opinion Corresponding to PCT/EP2013/074006 mailed Feb. 28, 2014.
International Preliminary Report on Patentability Corresponding to PCT/EP2013/074006 mailed Feb. 11, 2015.

* cited by examiner

JOINT DEVICE FOR A MOTOR VEHICLE

This application is a National Stage completion of PCT/EP2013/074006 filed Nov. 18, 2013, which claims priority from German patent application serial no. 10 2012 223 829.8 filed Dec. 19, 2012.

FIELD OF THE INVENTION

The invention concerns a joint device, comprising an axially extending pivot pin, in particular a so-termed claw, and an elastically deformable layer that radially surrounds this either fully or partially, which layer on its radially outer side is in contact at least in some areas with an outer housing and which, at least at one axial end, is connected and in particular vulcanized to an annular body, wherein the pivot pin with the elastically deformable layer and the at least one annular body form a joint body that can move relative to the housing.

BACKGROUND OF THE INVENTION

Joint devices of this type are often also known as molecular joints. In such cases the pivot pin is, for example, ball-shaped.

To ensure a high level of comfort, it is known to make the inner wall of the housing not circular-cylindrical all the way through, but to provide it with a recess having, for example, a radius of 100 millimeters so that a concavely curved inner wall is produced, into which during assembly the elastically deformable layer can be pressed under axial pre-stress. In such a case, under low loading the joint device is highly deflective so that good comfort and acoustic properties are achieved. However, with the low pre-stressing of the joint device that results from the comfort-orientated design, when the joint undergoes torsion, premature slipping of the deformable layer, or of a shell associated with it, relative to the housing can take place. In particular, slipping of a shell relative to a locking ring that braces the joint body is associated with the emission of a lot of creak-like noise. Furthermore, if relative movement takes place between the elastomer layer and the wall of the housing during operation, this can result in increased wear and a reduction of the pre-stressing of the joint.

SUMMARY OF THE INVENTION

The present invention addresses the problem of improving this situation, particularly in the case of such comfort-orientated joints but also for other joints comprising an elastically deformable layer.

The invention solves this problem with a joint device having the characteristics below and with a motor vehicle having a joint device as described below.

With the invention, it is ensured by virtue of the fact that the ability of the joint body to twist about its longitudinal axis is impeded by rotation-impeding means provided in addition to the contact between the outside of the elastically deformable layer and the housing, that even if the axial pre-stressing is relatively small there is still high resistance to failure of the joint and the joint provides a high level of comfort even when subjected to twisting.

Inasmuch as the rotation-impeding means act in a frictional manner between the joint body and the housing, above a certain limit load in the twisting direction it is possible for relative movement between the joint body and the housing to take place. However, particularly with smaller rotation angles twisting between the joint body and the housing can be completely excluded. Moreover, frictional bracing of the components against one another ensures that there is no rattling, even under load.

If the rotation-impeding means operate by interlock between the joint body and the housing, twisting movements between the joint body and the housing can be avoided even with large twist angles.

The rotation-impeding means can be in the form of measures arranged radially on the outside of the joint body and/or radially on the inside of the housing. Depending on the geometry and size of the joint device concerned, there are thus various realization options.

To produce a rotation-impeding arrangement it is beneficial to fix at least one shell connected to the elastic layer into the housing by press fitting, so that the shell no longer has any play in its fitted position and can only twist relative to the housing under the action of very large forces.

In this case, to assist the press fitting, radially outward-facing serrations in the manner of knurling can be formed on at least one shell connected to the elastic layer. Depending on the design, this can for example prevent slipping up to a very large limiting angle of 45°. The usual value required for such a limiting angle is in most cases in the range of only 10° to 20°.

It is advantageous to support the shell frictionally against the housing by means of the serrations. The serrations can in such a case be made of a material stronger than the housing, so that even after prolonged operation the teeth do not wear down.

In addition or alternatively to the frictional retention, the serrations can engage in the radially inward-facing wall of the housing. In particular, it is also possible for a purely frictional retention to exist at first, which after a certain operating time is supplemented by an interlocking connection.

Instead of serrations on the radially outer side, serrations can also be arranged on the radially inward-facing side of the housing.

Furthermore, it is also possible for at least part of the radially outward-facing surface of the elastic layer to be adhesively bonded to the housing as rotation-impeding means. The contact area there is large, so that bonding over an area would only have to withstand small point by point forces.

In particular, although not necessarily, a joint arrangement according to the invention forms a comfort-orientated joint as described above. In this case the joint body in its fitted position is axially pre-stressed and by virtue of the axial pre-stressing the elastic layer in the fitted condition is pressed into a radial free recess of the housing. By virtue of the radial free recess, a concave wall shape of the radially inward-facing wall of the housing is formed, so that a contact space for the elastically deformable layer is formed there.

Alternatively, as rotation-impeding means the joint body and the receiving space of the housing can have an outline that is not rotationally symmetrical, in particular an oval outline. In that case twisting of the components relative to one another about the axis of the pin is prevented even above any limiting angle.

A further, additional or alternative possibility for impeding rotation is to provide as rotation-impeding means, blocking means, in particular pins, that engage with an axial component in a locking ring and a shell of the joint body. These would then also be able to block the twisting movement at any angle.

A motor vehicle with at least one joint device according to the invention is also described below.

In particular, such a motor vehicle can be a commercial vehicle (CV), and such a joint device can serve to connect suspension components to a vehicle chassis.

BRIEF DESCRIPTION OF THE DRAWINGS

Further advantages and characteristics of the invention emerge from example embodiments of the object of the invention illustrated in the drawing and described below.

The drawings show.

DETAILED DESCRIPTION OF THE PREFERRED EMBODIMENTS

Figure 1:
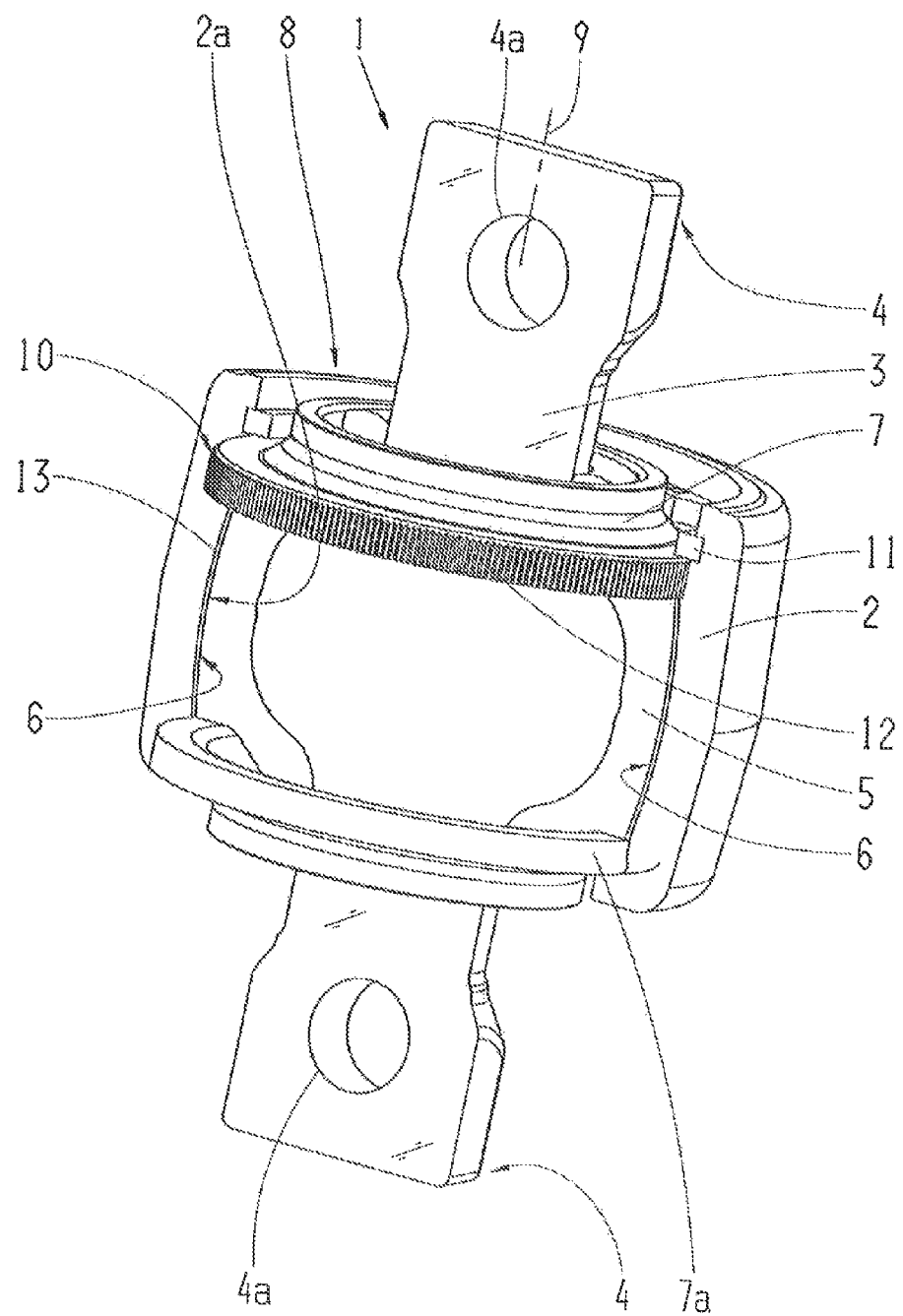
FIG. 1: A perspective representation of a possible joint device with radially outward-facing knurling on a shell connected to the elastically deformable layer.
Figure 2:
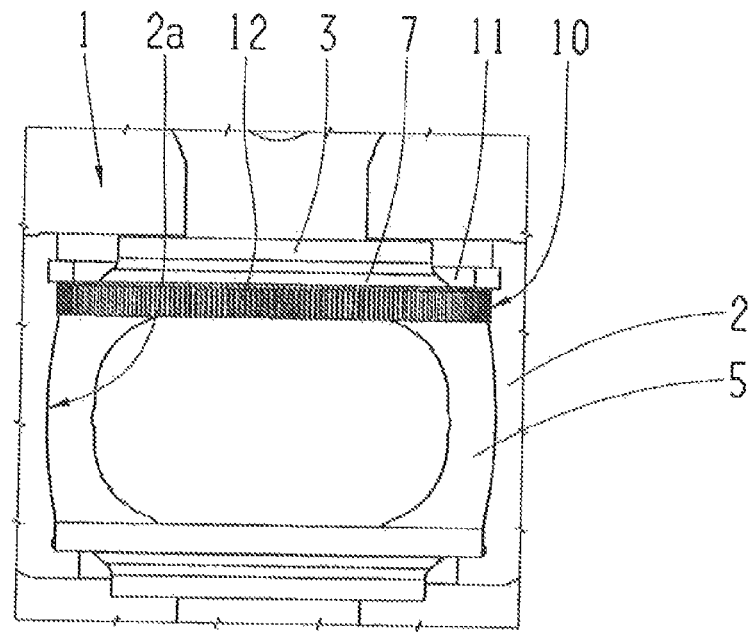
FIG. 2: A longitudinal section of the central area of the joint device according to FIG. 1, FIG. 3: A detailed view of the shell vulcanized to the elastically deformable layer, with the outward-facing knurling.
Figure 3:
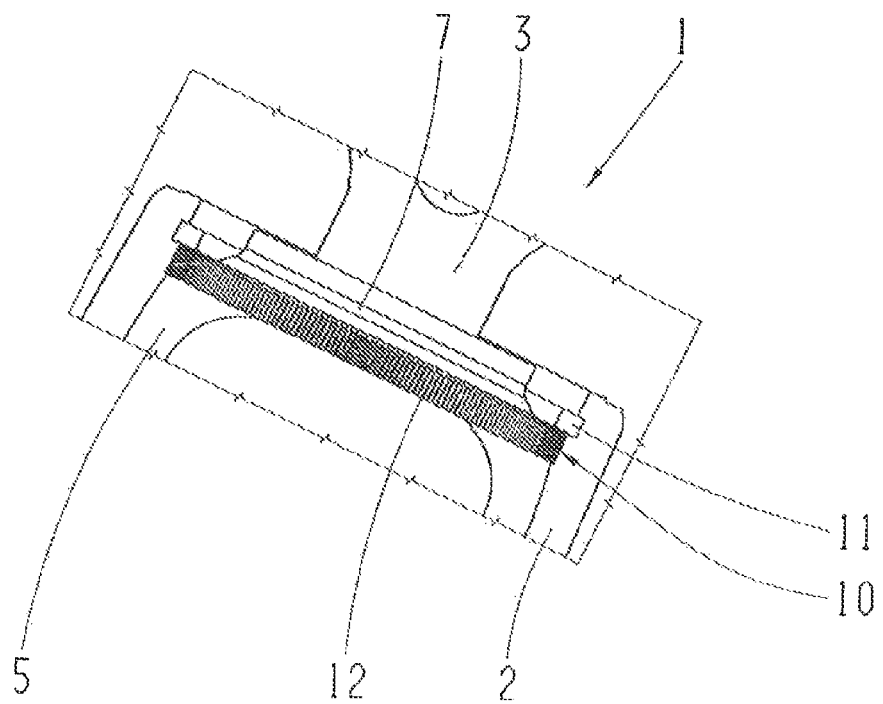
Figure 5:
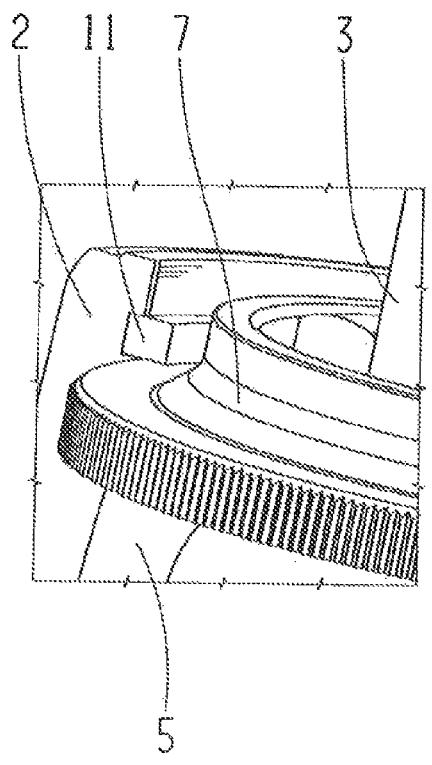
FIG. 5: A view similar to that of FIG. 4, but obliquely "from above", with locking rings that hold and axially pre-stress two ends of the joint body.
Figure 4:
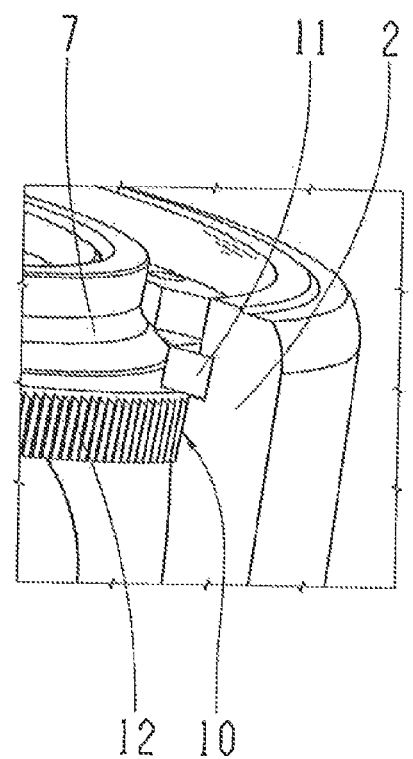
FIG. 4: A detailed view of the shell with knurling under a locking ring that holds it.

A motor vehicle fitted with one or more joint devices 1 according to the invention is often a commercial vehicle (CV) with a chassis. Such a chassis can typically comprise lateral longitudinal members and several transverse members. Suspension components, for example, can be held on the chassis by control arms and associated joint devices 1. The control arm can be an integral part of a housing 2 of the joint device 1 concerned. Also, for example, a building-site vehicle or an off-road vehicle can be fitted with joint devices 1 according to the invention.

Such a joint device 1 comprises an axially extending pivot pin 3, in particular a so-termed claw, which in this case is widened in the middle to form a ball shape. At its axially outer ends 4, the pivot pin 3 can be provided with bores 4a for receiving holding means and for fixing to another component. A symmetrical shape from the center outward, as shown in this case, is not obligatory.

The joint device 1 also comprises an elastically deformable and in itself solid, rubber-like layer 5 that fully or partially surrounds the pivot pin 3, which when not axially pre-stressed has for example a circular-cylindrical shape radially on the outside 6. The thickness of the layer 5 thus varies over its axial length. As a whole, in this case it is of sleeve-like form particularly around the ball-shaped wider area of the pin 3.

By axial pre-stressing, the outside can for example curve outward and thus fill a free space 2a on the inside of the housing 2. At least in some areas the outside 6 is in contact with the housing 2. At least at one axial end, the elastically deformable layer 5 is connected firmly, in particular vulcanized to an annular body 7 that acts in the manner of a shell. Moreover, for example a locking ring 11 can be held in a groove to secure the annular body 7 and the elastically deformable layer 5 when axially pre-stressed. The locking ring 11 can for example also be a multi-layer laminated ring.

The pivot pin 3 with the elastically deformable layer 5 and the at least one shell-like annular body 7 form a joint body 8 which can move as a whole relative to the housing 3. To prevent any slipping of the joint body 8 relative to the housing already at too small a rotation angle about the axis 9, the ability of the joint body 8 to rotate about its longitudinal axis 9 is impeded by rotation-impeding means 10 and further the contact of the outside 6 of the elastically deformable layer 5 against the housing 2. In this context impede can mean that rotation is made more difficult, or made more difficult under a limiting force, or inhibited, or even that rotation is completely blocked, while a compression and tensile load can be maintained by virtue of the elastic layer 5.

At the axially opposite end, the elastically deformable layer 5 can also be vulcanized firmly to a further annular body 7a, which is secured behind a locking ring. Alternatively, the housing 2 can in this case be of cup-shaped design so that an additional locking ring is not needed. Also, the second ring 7a does not have to be connected permanently to the elastically deformable layer 5. Overall, the invention allows various options for designing at least the pivot pin 3, the elastic layer 5, the joint body 8 containing the ring 7 and the configuration of the rotation-impeding means 10 between the joint body and the housing 2.

In the example embodiment shown here, to form the rotation-impeding means 10, outward-facing serrations 12 in the manner of knurling are formed on at least one shell 7 connected to the elastic layer 5. In the present case the serrations are formed integrally on the shell 7, which excludes further possible defect sources and weak points, The serrations 12 extend over the full axial height of the shell 7 and thus have an axial height of a few millimeters up to the centimeter range. By virtue of this serration 12, the shell 7—and with it the entire joint body 8—is held by a press fit in the housing 2 and thereby supported at least by friction against the housing 2. In addition the serrations 12 can also engage with interlock a short way in the radially inward-facing wall of the housing 2. Depending on the material pairing and the pressing-in pressure the proportion of interlock can vary. Moreover, the interlock proportion can increase in the course of longer operating times.

Basically it is also possible for the rotation-impeding means 10 to act completely with interlock between the joint body 8 and the housing 2, possibly by virtue of radially outward-projecting tabs of the joint body 8 which engage in complementary recesses of the housing 2.

In the example embodiment described here, the rotation-impeding means 10 are formed by measures provided on the radially outer side of the joint body 8, namely the knurling 11 on the ring 7, and also by pressing the component 7 into the housing 2. In addition or alternatively, knurling or some other suitable measure could be arranged on the radially inner side of the housing 2 for ensuring rotation suppression.

Likewise, at least part of the radially outward-facing surface of the elastic layer 5 can be adhesively bonded to the housing 2 to inhibit rotation. Such a bonded area 13 is shown in FIG. 1. That measure can even be provided in addition to knurling or other measures. The bonding can also be done in such manner that it is effective only at small rotation angles but comes apart above a certain limiting load.

Overall, the joint body and the space that accommodates it in the housing can have a contour design that deviates from rotational symmetry, in particular an oval outline, to inhibit rotation.

The rotation inhibition does not have to involve radially acting measures such as the knurling 12, but rather, axially engaging blocking means can also be provided, for example pins or the like, which engage with an axial component in a locking ring 11 and a shell 7 of the joint body 8.

It is understood that such a joint device 1 can be used at various points in a vehicle, in particular also in linkages and chassis joints.

INDEXES

1 Joint device
2 Housing
2a Free recess space
3 Pivot pin
4 Axial ends of the pivot pin
4a Bores
5 Elastically deformable layer
6 Radially outer side of the elastically deformable layer
7 Shell-like annular body
7a Axially oppositely positioned annular body
8 Joint body
9 Longitudinal axis
10 Rotation-impeding means
11 Locking ring
12 Serrations
13 Bonded area

The invention claimed is:

1. A joint device (1) comprising:
an axially extending pivot pin (3),
an elastically deformable layer (5) either wholly or partially surrounding the pivot pin radially,
the elastically deformable layer being at least partially in contact, on a radially outer side (6) thereof, with a housing (2) and being connected at least at one axial end with an annular body (7),
the pivot pin (3) with the elastically deformable layer (5) and the at least one annular body (7) forming a joint body (8) which is movable relative to the housing (2),
the joint body (8) being rotatable about its longitudinal axis (9), and rotation of the joint body (8) being inhibited by contact of the outer side (6) of the elastically deformable layer (5) against the housing,
the annular body (7) being held in the housing (2) by a press fit,
serrations (12) being arranged on an outer circumference of the annular body (7) and facing radially outward toward the housing (2),
the serrations (12) engaging in a radially inward-facing wall of the housing (2) and impeding an ability of the joint body (8) to rotate about its longitudinal axis (9), and
a locking ring (11) being held in a groove, provided in the housing (2), which under axial pre-stressing secures the annular body (7) and the elastically deformable layer (5) in the housing (2).

2. The joint device (1) according to claim 1, wherein the annular body (7) is frictionally supported against the housing (2) by the serrations (12) on an outer circumference of the annular body.

3. The joint device (1) according to claim 1, wherein by virtue of the pre-stressing, the elastic layer (5), in a fitted position, is pressed into a radial free space (2a) of the housing (2).

4. The joint device (1) according to claim 3, wherein by virtue of the free space (2a), the inward-facing wall of the housing (2) is concave.

5. The joint device (1) according to claim 1, the joint device further comprises a blocking device that engages with an axial component in a locking ring (11) and a shell (7) of the joint body (8).

6. The joint device (1) according to claim 5, wherein the locking ring (11) is a multi-layer ring.

7. The joint device (1) according to claim 5, wherein the protrusion is a pin.

8. The joint device (1) according to claim 1, wherein the elastically deformable layer (5) is vulcanized onto the annular body (7).

9. A joint device for a motor vehicle, the joint device comprising:
an axially extending pivot pin (3),
an elastically deformable layer (5) either wholly or partially surrounding the pivot pin radially,
the elastically deformable layer being at least partially in contact, on a radially outer side (6) thereof, with a housing (2) and being connected at least at one axial end with an annular body (7),
the pivot pin (3) with the elastically deformable layer (5) and the at least one annular body (7) forming a joint body (8) which is movable relative to the housing (2),
the joint body (8) being rotatable about its longitudinal axis (9), and rotation of the joint body (8) being inhibited by contact of the outer side (6) of the elastically deformable layer (5) against the housing,
the annular body (7) being held in the housing (2) by a press fit,
serrations (12) being arranged on an outer circumference of the annular body (7) and face radially outward toward the housing,
the serrations (12) engaging in a radially inward-facing wall of the housing (2), and
a locking ring (11) being held in a groove provided in the housing (2) which, under axial pre-stressing, secures the annular body (7) and the elastically deformable layer (5) in the housing (2).

10. The joint device for a motor vehicle of claim 9, further comprising a protrusion on the annular body (7) configured to engage with an axial component in a locking ring (11).

11. A joint device comprising:
an axially extending pivot pin,
an elastically deformable layer at least partially radially surrounding the pivot pin, and the elastically deformable layer having a radially outer surface that contacts a housing and at least at one axial end that is vulcanized to an annular body;
the pivot pin, the elastically deformable layer and the at least one annular body forming a joint body which is pivotable relative to the housing,
rotation of the joint body about a longitudinal axis thereof is impeded by contact of the radially outer surface of the elastically deformable layer against the housing,
the annular body being retained within the housing by a press fit,
a radially outward facing surface of the annular body has a plurality of serrations that engage in a radially inward facing wall of the housing, and
a locking ring being held in a groove provided in the housing to secure the annular body and the elastically deformable layer in the housing under axial pre-stress.

12. The joint device of claim 11, further comprising a protrusion on the annular body (7) configured to engage with an axial component in a locking ring (11).

* * * * *